(12) United States Patent
Waller et al.

(10) Patent No.: US 6,751,229 B1
(45) Date of Patent: Jun. 15, 2004

(54) NETWORK TERMINATOR

(75) Inventors: Arthur Simon Waller, Basingstoke (GB); Anthony David Shaw, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 739 days.

(21) Appl. No.: 09/618,340

(22) Filed: Jul. 18, 2000

(30) Foreign Application Priority Data

Jul. 20, 1999 (GB) ............................................. 9917031

(51) Int. Cl.$^7$ ............................................. H04L 12/56
(52) U.S. Cl. ..................... 370/419; 370/395.1; 370/474
(58) Field of Search ................................. 370/374, 466, 370/352–356, 400, 401, 491, 398, 485, 348, 395.1, 395.54, 395.6, 419; 379/221.02, 88.17

(56) References Cited

U.S. PATENT DOCUMENTS

| | | | |
|---|---|---|---|
| 5,220,560 A | * | 6/1993 | Ogasawara ................. 370/466 |
| 5,648,958 A | | 7/1997 | Counterman ................ 370/458 |
| 5,666,487 A | | 9/1997 | Goodman et al. ........... 709/458 |
| 5,677,905 A | | 10/1997 | Bigham et al. ......... 370/395.21 |
| 5,850,400 A | | 12/1998 | Eames et al. ................ 370/443 |
| 5,881,362 A | | 3/1999 | Eldering et al. ............. 725/125 |
| 6,285,685 B1 | * | 9/2001 | Bum .......................... 370/374 |

FOREIGN PATENT DOCUMENTS

WO    WO 99 33229    7/1999

* cited by examiner

Primary Examiner—John Pezzlo
(74) Attorney, Agent, or Firm—Frommer Lawrence & Haug LLP; William S. Frommer

(57) ABSTRACT

A network terminator for connection to a digital broadcast system, the network terminator including a front end for receiving downstream data packets and having a Medium Access Control unit for transmitting upstream data, a processor having at least one data interface, the processor distinguishing data protocols so as to route appropriate received data packets to said data interface and having an ATM segmentation unit for preparing ATM cells for transmission by the front end, and a telephony unit for connection to at least one analog telephone line and for converting analogue speech signals to/from digital packets, wherein the processor routes appropriate received data packets to the telephony unit and prepares ATM cells from digital packets from the telephony unit for transmission by the front end.

14 Claims, 1 Drawing Sheet

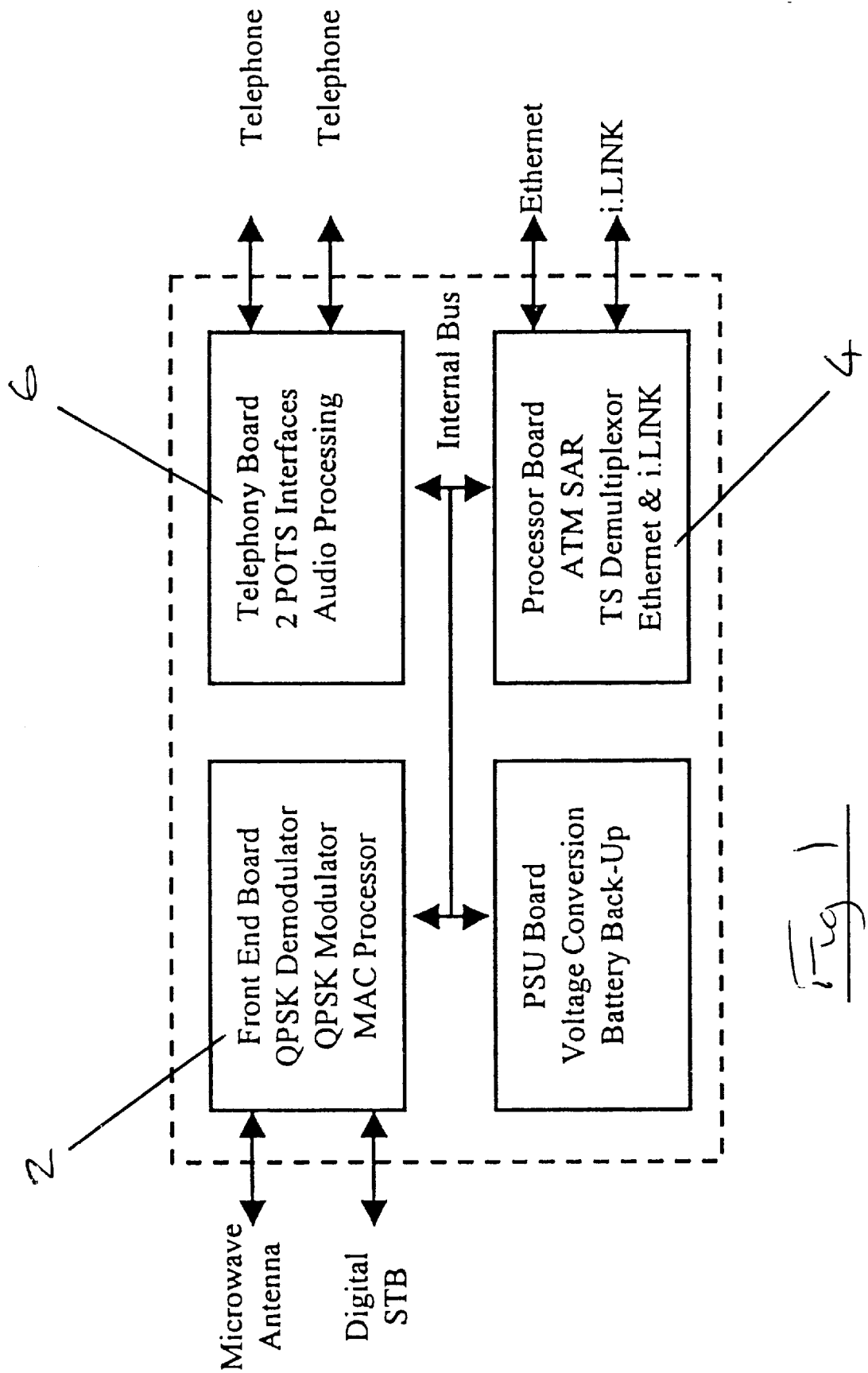

NETWORK TERMINATOR

BACKGROUND OF THE INVENTION

1. Field of the Invention

The present invention relates to a network terminator and, more particularly, to a network terminator for connection to a digital broadcast system.

2. Description of the Related Art

The advent of digital television services offers the possibility of delivering interactive as well as broadcast services into the home. Various delivery methods to the home are being deployed, such as the Multipoint Video Delivery System (MVDS). Each home in the MVDS network would have a bidirectional microwave link to the head end for high bandwidth communication which will be in the 40.5–42.5 Ghz band. Networks would consist of multiple cells up to 4 kilometres diameter which are served by a head end. These areas could co-exist with cabled regions or be used where it is considered too expensive to cable in order that operators can extend their service areas.

Digital TV services may be broadcast in the format of a transport stream for instance as specified by DVB (EN 301 199, Digital Video Broadcasting; DVB Interaction Channel for LMDS Distribution System). This stream may include multiple program channels and other information. In this regard, a Forward Interaction path (downstream) may consist of control and interactive data interleaved with the program material. Furthermore, a Return Interaction path (upstream) may be provided using a 50 MHz block at the edge of the main downstream frequency range to convey user application data and responses to control messages.

OBJECTS AND SUMMARY OF THE INVENTION

The present application recognises for the first time that such digital broadcast systems, in allowing the transmission of various services and formats effectively simultaneously, present the user with a problem in making use of the services. In particular, there is no way in which a user can make use of the digital broadcast system for telephony at the same time as connecting a computer data interface.

According to the present invention, there is provided a network terminator for connection to a digital broadcast system, the network terminator including a front end for receiving downstream data packets and having a Medium Access Control unit for transmitting upstream data, a processor having at least one data interface, the processor distinguishing data protocols so as to route appropriate received data packets to the data interface and having an ATM segmentation unit for preparing ATM cells for transmission by the front end and a telephony unit for connection to at least one analog telephone line and for converting analogue speech signals to/from digital packets, wherein the processor routes appropriate received data packets to the telephony unit and prepares ATM cells from digital packets from the telephony unit for transmission by the front end.

In this way, the processor can distinguish data packets of different types and re-route them accordingly. A user may connect a telephone together with at least one other data interface and both the telephone and the data interface may make use of the digital broadcast system at the same time and without the need of the user to switch between devices connected to the digital broadcast system.

Preferably, the processor includes a transport stream demultiplexer for demultiplexing data packets of different protocols in the data stream received by the front end. The processor may include data interfaces for various systems such as Ethernet or i.LINK.

The front end may include a QPSK demodulator and may be used for receiving MPEG transport stream packets on the QPSK modulated satellite IF frequency range and/or can include a QAM demodulator for use for instance on a dedicated cable network. Furthermore, the front end may include a QPSK modulator for upstream transmission.

The telephony unit may include a PSTN Line Interface which may be POTS or ISDN grade.

BRIEF DESCRIPTION OF THE DRAWING

FIG. 1 illustrates a schematic block diagram of a network terminator embodying the present invention.

DETAILED DESCRIPTION OF THE PREFERRED EMBODIMENTS

The invention will be more clearly understood from the following description, given by way of example only, with reference to the accompanying drawing.

The Network Terminator (NT) provides telephony, internet access, video on demand and broadcast services.

The Network Terminator can interface between the microwave transceiver on a user's roof and the equipment in the home: a digital Set Top Box (STB) for broadcast and Video-on-Demand services, a PC connected via Ethernet or i.LINK which can access the Internet via the Network Terminator, and two telephone handsets for standard telephony services into the PSTN. The system can be made compliant with various specifications such as the DVB specification.

Digital TV services are broadcast in a Transport Stream as specified by DVB. This stream may include multiple programme channels and other information, as well as a Forward Interaction path (downstream) which consists of control and interactive data interleaved with the programme material. A Return Interaction path (upstream) may use a 50 MHz block at the edge of the main downstream frequency range to convey user application data and responses to control messages.

Allocation of available upstream bandwidth is by Time Division Multiple Access (TDMA), whereby the bandwidth is divided into a number of fixed length slots. A Media Access Control (MAC) layer of the protocol between the head end and the user terminal is used to define which users will be allocated bandwidth, on which frequencies and in which slot positions. It is also used to define synchronisation information to all of the end users. The MAC requires both time critical functionality and high-level management functions, acting as the interface between the physical layers (the electrical connections to the head end) and the user's application. This is defined by Digital Video Broadcasting (DVB) standards and is almost identical for both cable and MVDS systems.

FIG. 1 illustrates a Network Terminator embodying the present invention. It is a modular design facilitating use within many network configurations, for example CATV, LMDS (Local Multipoint Distribution System) and MVDS.

The Front End 2 interfaces to an RF antenna via a single cable. It can receive downstream MPEG TS packets on a standard QPSK modulated "satellite" IF frequency range. It may also be used in a dedicated cable network or lower frequency MVDS below 10 Ghz by changing the front end to a QAM demodulator. Upstream data is preferably always QPSK modulated in order to ensure immunity to noise.

The Front End includes a MAC processor for controlling access to the upstream channel by a dynamic TDMA process, whereby the bandwidth allocation for each user is negotiated so that optimum use is made of valuable network capacity. The MAC may also receive instructions from the head end regarding required power levels and frequencies to use for transmission. These may be established by a dialogue between head-end and the Network Terminator known as "sign-on and calibration".

The demodulator outputs a Transport Stream (TS), which can contain a mixture of programme material, interactive data, and MAC messages (MAC messages control access to the available bandwidth). The TS passes into an ep1d, in which syncronisation information is extracted, and those packets which contain MAC messages. These are identified by a Packet Identifier (PID). If a packet containing a MAC message is detected, it is written into a FIFO memory (First In First Out), after which the MAC processor is interrupted. It then reads the message into its local memory and performs any actions as required in the message.

Transfer between MAC processor and QPSK Modulator also happens through an ep1d. When a slot occurs that is valid for the unit to transmit on and it has data to send from its local memory, the MAC processor is interrupted and it transfers a MAC message formatted into an ATM cell into the ep1d. The ep1d converts the data into the interface format for the mdoulator (which is a serial format known as DAVIC A0) and transfers the complete cell.

The Processor Board 4 acts as the main data router for the Network Terminator. Its function is the encapsulating/stripping of the various protocols within the network. It extracts IP (Internet Protocol) data from the downstream MPEG Transport Stream and directs it to either the telephony board or to a driver for some external data interface, for instance an Ethernet driver or an i.LINK. Internet Protocol is a method of encapsulating data to include source and destination address information, error correction data, and payload descriptors. It allows user data to be routed around computer/communication networks and reach its destination.

The upstream direction preferably uses ATM cells to encapsulate the IP data. Hence the Processor Board preferably includes an ATM segmentation function. As mentioned above, provision for an i.LINK interface can be made for home network connections.

The demodulator outputs the TS which in addition to being routed to the MAC processor as previously described, is also sent to the TS Demultiplexer. This is able to filter out only certain TS packets from the TS, which are relevant to this NT, and which contain the user data only. The device is programmed to extract only those packets with particular PIDs, and these are then stored in its local memory. When a complete packet has been stored, the processor (not the same one as the MAC processor), is interrupted and it copies the data to its own memory for further processing, such as routing the data to the ethernet interface or to the POTS telephony board. This data is actually IP packets, which are sub-divided into multiple TS packets.

To go upstream, the data is again IP, but is encapsulated into ATM cells (instead of TS packets). The NT uses the Segmentation function of the SAR (Segmentation And Reassembly), which divides blocks of user data (in this case IP packets), into the ATM cells. The processor writes data into its-memory, and when the front end (including MAC processor) indicates that a cell may be transmitted, the data is transferred over a Utopia interface to the ep1d and then the QPSK modulator. This process is automatic and without processor intervention.

The Telephony Board 6 provides interfaces for at least one, but as illustrated, two standard analogue telephone lines, converting the analogue speech to/from digital packets. These are passed to the Main Processor board for encapsulation in the communications protocols and subsequent routing to the head end.

For the telephony interface, the low level driver requires 8 bit bytes of data which represent the digitised samples of speech, using a sampling frequency of 8 kHz. These data are accumulated on the telephony board in a "Dual Port RAM" until 160 bytes are available, these are then transferred to the memory of the main processor. As this is just "raw" data, the processor must then encapsulate it in the "IP" protocol, which the SAR will segment and send upstream. In the reverse direction, the IP packets in the TS are stripped of the EP protocol, leaving the raw data, and are written into the Dual Port RAM for extraction by the telephony board and coversion to analogue voice to the telephone.

An expansion interface may be included to allow the inclusion of a voice data compression DSP. This would reduce the required data rates from for instance 64 kb/s to as little as 4–6 kb/s depending on the algorithm used and the required perceptual speech quality.

The telephone connections to the head end may be made using Internet Telephony protocols, for instance as specified using the ITU H.323 standard (ITU-T Recommendation H.323, Visual Telephone Systems and Equipment for Local Area Networks Which Provide a Non-Guaranteed Quality of Service). This offers a convenient way of encapsulating voice information into IP packets and providing the protocols for communicating with the telephony server for call signalling/setup etc. Resource Reservation Protocol may be used for bandwidth allocation so that the connection is guaranteed to have the required bandwidth available to support the call. UDP (as opposed to TCP) may be used with the IP as no re-send of voice data is required. A telephony gateway may be provided in the head end to interface with the external telephone exchange so that Internet Telephony is only required between the home and the head end. This avoids problems such as delay and packet loss found on the Internet.

We claim:

1. A network terminator for connection to a digital broadcast system, the network terminator including:
   a front end for receiving downstream data packets and having a Medium Access Control unit for transmitting upstream data;
   a processor having at least one data interface, the processor distinguishing data protocols so as to route appropriate received data packets to said data interface and having an ATM segmentation unit for preparing ATM cells for transmission by the front end; and
   a telephony unit for connection to at least one analog telephone line and for converting analogue speech signals to/from digital packets; wherein
   the processor routes appropriate received data packets to the telephony unit and prepares ATM cells from digital packets from the telephony unit for transmission by the front end.

2. A network terminator according to claim 1 wherein the processor has at least a data interface for an Ethernet or an i.LINK connection.

3. A network terminator according to claim 1 wherein the processor includes a transport stream demultiplexer for demultiplexing data packets of different protocols in the data stream received by the front end.

4. A network terminator according to claim 1 wherein the front end is for receiving MPEG transport stream packets on the QPSK modulated satellite IF frequency range.

5. A network terminator according to claim 1 wherein the front end includes a QPSK demodulator.

6. A network terminator according to claims 1 wherein the front end includes a QAM demodulator.

7. A network terminator according to claim 1 wherein the front end includes a QPSK modulator.

8. A network terminator according to claim 1 wherein the telephony unit includes a PSTN Line Interface which may be POTS or ISDN grade.

9. A network terminator according to claim 1 wherein the telephony unit includes an expansion interface for inclusion of a voice data compression DSP.

10. A network terminator according to claim 1 wherein telephone connections to the front end are made using Internet Telephony protocols.

11. A network terminator according to claim 10 wherein the Internet Telephony protocols are those specified by ITU H.323 standard.

12. A network terminator according to claim 10 wherein the Resource Reservation Protocol is used for bandwidth allocation so that the connection is guaranteed to have the required bandwidth.

13. A network terminator according to claim 1 having a front end configured for use with at least one of MVDS, CATV and LMDS.

14. A network terminator according to claim 1 wherein the front end includes a connection for a Set Top Box.

* * * * *